US008970254B1

(12) United States Patent
Murphy et al.

(10) Patent No.: US 8,970,254 B1
(45) Date of Patent: Mar. 3, 2015

(54) SYSTEMS AND METHODS FOR FREQUENCY DETECTION

(71) Applicant: QUALCOMM Incorporated, San Diego, CA (US)

(72) Inventors: Glenn Murphy, San Diego, CA (US); Jingcheng Zhuang, San Diego, CA (US); Xiaohua Kong, San Diego, CA (US); William Knox Ladd, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/195,378

(22) Filed: Mar. 3, 2014

(51) Int. Cl.
*G01R 23/02* (2006.01)
*H03D 3/00* (2006.01)
*H03K 9/06* (2006.01)
*H04L 25/02* (2006.01)
*H04L 25/49* (2006.01)
*H04L 7/033* (2006.01)

(52) U.S. Cl.
CPC ........ *H04L 25/0262* (2013.01); *H04L 25/4902* (2013.01); *H04L 7/0331* (2013.01)
USPC .............. 327/39; 327/145; 327/147; 327/156

(58) Field of Classification Search
USPC ............ 327/39–49, 105–123, 141, 144–163; 331/1/A, 15–17; 375/373–376
See application file for complete search history.

(56) References Cited

U.S. PATENT DOCUMENTS

| 5,870,002 | A  | * | 2/1999 | Ghaderi et al. | 331/17 |
| 6,388,488 | B1 | * | 5/2002 | Ho | 327/206 |
| 6,903,615 | B2 | * | 6/2005 | Landman et al. | 331/57 |
| 7,102,392 | B2 |   | 9/2006 | Hsu et al. | |
| 7,233,182 | B1 | * | 6/2007 | Savoj | 327/141 |
| 7,733,146 | B2 | * | 6/2010 | Von Thun | 327/261 |
| 2004/0135597 | A1 | * | 7/2004 | Seike | 326/87 |
| 2012/0163042 | A1 | * | 6/2012 | Zhou et al. | 363/21.17 |
| 2012/0216084 | A1 |   | 8/2012 | Chun et al. | |

FOREIGN PATENT DOCUMENTS

WO    WO-2009053366 A1    4/2009

* cited by examiner

*Primary Examiner* — Brandon S Cole
(74) *Attorney, Agent, or Firm* — Haynes and Boone, LLP

(57) ABSTRACT

Methods and systems according to one or more embodiments are provided for frequency detection. In an embodiment, a frequency detector is provided that includes a capacitor that discharges or charges responsive to binary states of an input signal.

30 Claims, 5 Drawing Sheets

SYSTEMS AND METHODS FOR FREQUENCY DETECTION

TECHNICAL FIELD

Embodiments of the present disclosure generally relate to electronic circuits or systems, and more particularly, to methods and systems for distinguishing between high-frequency and low-frequency signals.

BACKGROUND

It is conventional for a Serializer/Deserializer (SerDes) receiver to detect not only high-speed serial data but to also detect various side-band lower frequency signals. To do so, the SerDes receiver may include a frequency detector to distinguish between the high-speed data and the sideband signals. For example, a frequency detection filter such as an LC filter or RC filter may be used to perform this detection. However, the definition of "low frequency" with regard to distinguishing the side-band signals from the high-speed data depends upon the standard and varies widely. Therefore, a third order or even higher filter design may be required to accommodate such a variable frequency cutoff between the sideband signaling and the high-speed serial data. But multiple-pole LC filters are bulky and impractical. Similarly, RC filters also demand significant die space and consume substantial amounts of power. Alternatively, oversampling circuits may be used but such circuits are also bulky and power-intensive as the distinction between the side-band signaling and the high-speed data is pushed into the higher frequencies such as in the PCIE standard.

In addition, the voltage levels (signal amplitudes) are also variable depending upon the particular standard being implemented. A modern SerDes receiver may need to accommodate input signal amplitude variations of more than five times in some cases. Low-frequency, small-amplitude signals must pass through the same frequency detection filter in such a receiver as do high-frequency, large-amplitude signals. This amplitude variation further complicates the design of multi-pole frequency detection filters such as RC filters.

Accordingly, there is a need in the art for systems and methods for improved frequency detection.

SUMMARY

According to one or more embodiments of the present disclosure, systems and methods are provided for frequency detection with improved power and area efficiency. The frequency detector includes a capacitor that charges and discharges according to current-source-controlled currents in response to an input signal. In one embodiment, in response to the input signal transitioning from a low voltage to a high voltage, the capacitor discharges. Conversely, the capacitor charges in response to the input signal transitioning from the high voltage to the low voltage.

The charging and the discharging rate of the capacitor is limited by the current-source-controlled current. For example, the capacitor may charge according to current from a first current source and discharge according to a current from a second current source. These rates determine the cutoff frequency for the detector. In one embodiment, the frequency detector may compare a terminal voltage for the capacitor to at least one threshold voltage. If the capacitor charges higher than the at least one threshold voltage, the frequency detector transitions a binary state for an output signal responsive to the binary transition in the input signal that triggered the capacitor to charge. Similarly, if the capacitor discharges lower than the at least one threshold voltage, the frequency detector transitions the binary state for the output signal responsive to the binary transition in the input signal that triggered the capacitor to discharge.

The charging and discharging rate of the capacitor with regard to the at least one threshold voltage thus determines the cutoff frequency. The current sources may be adjustable so that the cutoff frequency may also be adjusted as desired. For example, cutoff frequencies may be used in a range from 10s of MHz to 1 GHz, which may allow the circuit to be used for various signaling standards such as USB3, PCIE, SATA or MPHY standards. Also, embodiments herein may be easily adapted to detect unique data patterns such as Pulse Width Modulated (PWM) patterns.

DETAILED DESCRIPTION

A frequency detector is disclosed that drives an output signal to transition between binary states in response to binary state transitions in an input signal if the input signal frequency is below a cutoff frequency. If the input signal frequency is above the cutoff frequency, the frequency detector blocks the output signal from transitioning. As used herein, "frequency detection" refers to a binary decision: an incoming signal is either deemed to be a low-frequency signal or a high-frequency signal with regard to the cutoff frequency. A "frequency detector" as used herein thus refers to a circuit configured to receive an input signal and determine whether the input signal is a low-frequency signal or a high-frequency signal with regard to the cutoff frequency that distinguishes between the two frequency regimes. Such a binary decision is quite useful in, for example, a SerDes receiver with regard to distinguishing the low-frequency sideband signaling from the high-speed serial data. Alternatively, a pulse-width demodulator may advantageously demodulate a pulse-width modulated signal using such a frequency detector. As yet another application, a time-to-digital converter may include such a frequency detector. The following discussion will be directed to a SerDes receiver embodiment but it will thus be appreciated that the disclosed frequency detector has numerous other applications such as those discussed above.

Figure 1:
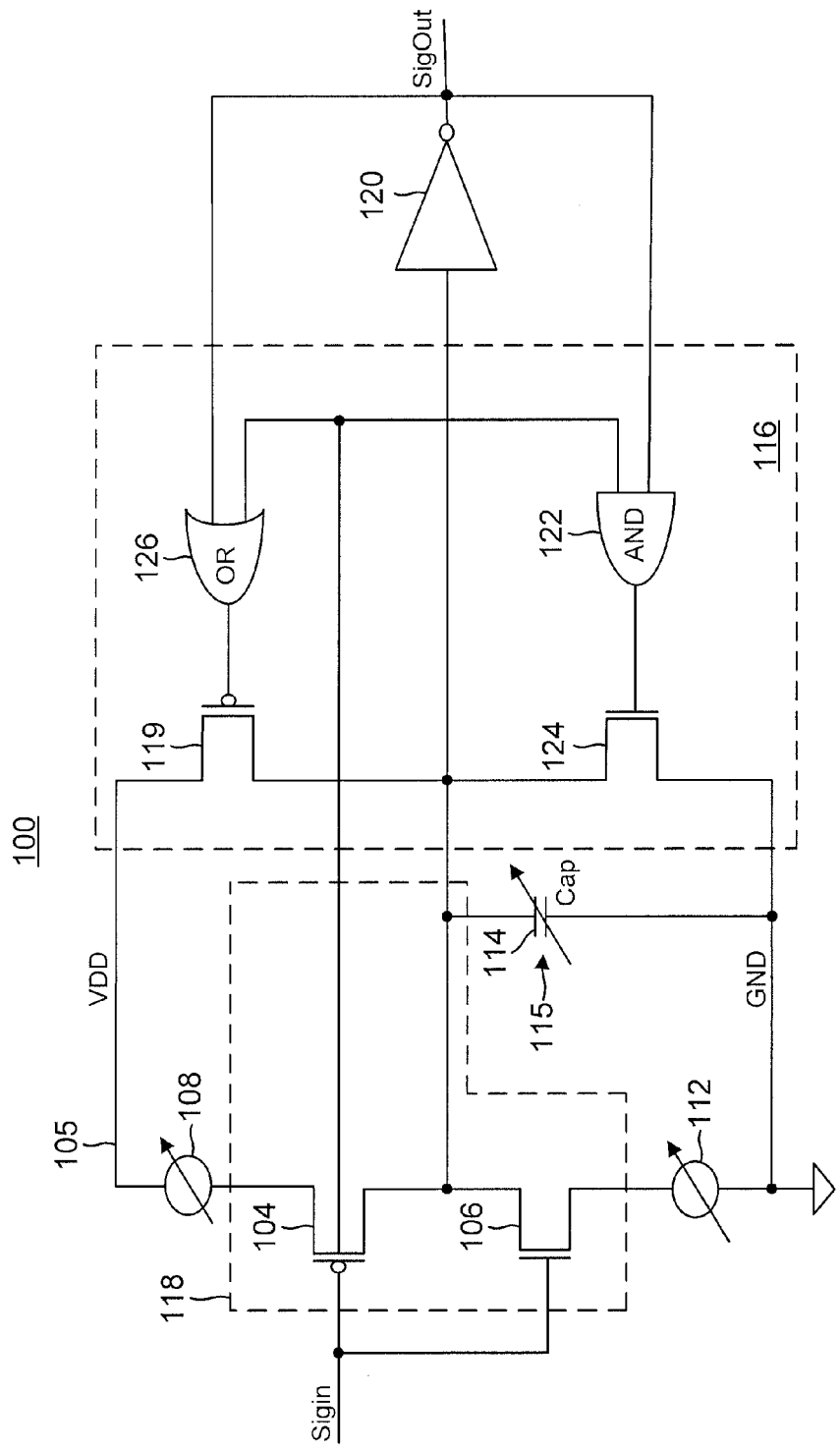
FIG. 1 is a circuit diagram for a frequency detector according to an embodiment of the present disclosure.

Turning now to the drawings, a frequency detector 100 is shown in FIG. 1 that includes a switch 118 configured to discharge and charge a capacitor 115 responsive to a binary state for an input signal (Sigin). For example, if the input signal has a sufficiently high voltage, it may be deemed to be in a first binary state. Conversely, if the input signal has a sufficiently low voltage, it may be deemed to be in a complementary second binary state. The following discussion will assume without loss of generality that the first binary state corresponds to a binary "1" state whereas the second binary state corresponds to a binary "0" state. Switch 118 responds to the input signal being high (a binary 1) by coupling a terminal 114 of capacitor 115 to a current source 112 that couples between switch 118 and ground. Similarly, switch 118 responds to the input signal being low (a binary zero) by coupling terminal 114 of capacitor 115 to a current source 108 that couples between switch 118 and a power supply node 105 supplying a power supply voltage VDD.

Switch 118 thus functions inversely with regard to the binary state of the input signal. If the input signal is high, switch 118 functions to discharge capacitor 115. Conversely, if the input signal switches low, switch 118 functions to charge capacitor 115. In one embodiment, switch 118 is instantiated through a PMOS transistor 104 and an NMOS transistor 106. A source of PMOS transistor 104 couples to power supply node 105 through current source 108. Similarly, a source of NMOS transistor 106 couples to ground through current source 112. The input signal drives the gate of both transistors 104 and 106. Note how the advantageous inclusion of current sources 108 and 112 controls the charging and discharging rates of capacitor 115: for example, if current source 108 were absent, PMOS transistor 104 would directly couple capacitor 115 to power supply node 105 when the input signal switches low. Such a direct coupling would quickly charge terminal 114 of capacitor 115 to VDD. Similarly, if current source 112 were absent, NMOS transistor 106 would directly couple capacitor 115 to ground when the input signal switches high. But such rapid charges and discharges for capacitor 115 are undesirable because frequency detector 100 must distinguish between high-frequency signaling (high-speed data) on the input signal versus low-frequency operation of the input signal. During high-frequency operation, the input signal switches between one and zero at a relatively fast rate. If the input signal switches low, capacitor 115 will thus be charged to VDD very quickly during high-frequency operation (in the absence of current source 108). Such a fast charge of capacitor 115 may thus be sufficient to charge terminal 114 to VDD during the relatively brief periods that the input signal is pulled low during high-frequency operation. This is plainly undesirable as capacitor 115 would thus be charged to VDD when the input signal switches from high to low in both the high-frequency and low-frequency regimes. Frequency detector 100 would then have no way of distinguishing between these frequency regimes when the input signal switches low. However, current source 108 controls the charging rate of capacitor 115 such that capacitor 115 cannot be recharged during the relatively brief periods in which the input signal is pulled low during high-frequency operation. Conversely, current source 108 provides enough charge in the relatively longer periods in which the input signal is pulled low during low-frequency operation such that frequency detector 100 can effect its frequency detection to distinguish between the two frequency regimes.

One can thus appreciate the role of current source 108: it controls the charging rate of capacitor 115 after PMOS transistor 104 switches on. Similarly, current source 112 controls the discharging rate of capacitor 115 after NMOS transistor 106 switches on. If current source 112 were absent, terminal 114 would be directly coupled to ground through NMOS transistor 106 during the relatively brief periods when the input signal is driven high during high-frequency operation. Capacitor 115 would thus quickly discharge during such relatively brief periods in the absence of current source 112 such that frequency detector 100 would have no means of making its frequency detection in response to the input signal being driven high in high-frequency operation.

To distinguish between the high-frequency and low-frequency regimes for the input signal, an inverter 120 in frequency detector 100 receives the voltage on terminal 114 for capacitor 115 and inverts a binary state for this voltage into an output signal (Sigout). Such an inversion is performed with regard to at least one inverter threshold voltage (e.g., a convenient inverter threshold voltage is VDD/2). The following discussion assumes there is no hysteresis in inverter 120 for ease of illustration such that there would only be a single inverter threshold voltage. But as will be discussed further herein, the principle of operation does not change if two threshold voltages are used. As switch 118 discharges capacitor 115 in response to NMOS transistor 106 turning on from the input signal switching from low to high, terminal 114 will be pulled from VDD towards the threshold voltage. Current source 112 controls this drop in voltage from occurring too fast. Thus, if the input signal were to then be pulled low before the voltage on terminal 114 could drop to the inverter threshold voltage (such as would occur in high-frequency operation because the fast switching rates result in Sigin staying high for just relatively brief periods in high-frequency operation), inverter 120 would not switch states of the output signal. But if the input signal remains high for a sufficiently long duration (as would occur during low-frequency operation), the voltage on terminal 114 may drop below the inverter threshold voltage such that the output signal is driven high in response to the input signal switching high.

A similar filtering occurs with regard to the input signal switching from high to low. As PMOS transistor 104 switches on from the input signal going low, terminal 114 will be charged from ground towards VDD. Current source 108 prevents this increase in voltage from happening too quickly. Thus, if the input signal were to then be pulled high before the voltage on terminal 114 could increase to the inverter threshold voltage (as would occur in high-frequency operation), inverter 120 would not switch states of the output signal. But if the input signal remains low for a sufficiently long duration (as would occur during low-frequency operation), the voltage on terminal 114 may increase above the inverter threshold voltage such that the output signal is driven low by inverter 120.

The charging and discharging rate of capacitor 115 thus determines the cutoff frequency for frequency detector 100. The charging/discharging rates depend upon the amount of capacitance for capacitor 115 as well as the current amplitudes sourced by current sources 108 and 112. In one embodiment, to provide additional flexibility in setting the cutoff frequency for frequency detector 100, capacitor 115 may comprise a variable capacitor 115. Frequency detector 100 thus functions to compare the frequency for the input signal to the cutoff frequency. If the input signal has a fast switching rate (high-frequency operation), the input signal will not stay low long enough that capacitor 115 may charge higher than the inverter threshold voltage. Similarly, the input signal would not stay high long enough in high-frequency operation such that capacitor 115 may discharge lower than the inverter threshold voltage. Conversely, when the input signal has a switching rate lower than the cutoff frequency (low-frequency operation), the input signal will stay high long enough such that capacitor 115 may discharge lower than the inverter threshold voltage. Similarly, the input signal will stay low long enough that capacitor 115 may charge higher than the inverter threshold voltage in low-frequency operation.

The preceding discussion assumes that terminal 114 is charged to VDD prior to the input signal switching high in low-frequency operation. Similarly, the preceding discussion assumes that terminal 114 is discharged to ground prior to the input signal switching low in low-frequency operation. Such assumptions are desirable because the voltage on terminal 114 should be in a known state prior to the discharging or charging operations. In other words, if terminal 114 is charged to VDD prior to the input signal switching low in low-frequency operation (or after some period of quiescence for the input signal), then it can be guaranteed that a sufficient period of time will transpire prior to the voltage on terminal 114 dropping below the inverter threshold voltage. Conversely, if terminal 114 were merely charged to some intermediate voltage (e.g., 3*VDD/4), then the voltage on terminal 114 could drop below the inverter threshold voltage prior to the expiration of a sufficient duration of time to exclude inverter 120 from reacting to high-frequency operation of the input signal. A similar argument applies to the complementary situation in which terminal 114 is discharged to ground and the input signal switches from high to low. In such a case, it can then be guaranteed that a sufficient period of time will transpire prior to the voltage on terminal 114 from rising above the inverter threshold voltage. But such a guarantee would not apply if the voltage on terminal 114 were instead rising from some intermediate voltage (e.g., VDD/4).

To fully charge or discharge capacitor 115 after the inverter threshold voltage has been crossed, frequency detector 100 may include a logic circuit 116. For example, inverter 120 may drive an OR gate 126 and an AND gate 122 in logic circuit 116. Each gate 126 and 122 also receives the input signal in addition to receiving the output signal. OR gate 126 controls a gate of a PMOS transistor 119 whose source couples to power supply node 105 and whose drain couples to terminal 114. If both the input and output signals are low, OR gate 126 drives PMOS transistor 119 on to charge terminal 114 to VDD. One can thus appreciate that PMOS transistor 119 "finishes the job" started by PMOS transistor 104. In other words, as discussed above, PMOS transistor 104 would charge capacitor 115 very quickly but for the presence of current source 108. For example, consider what happens when the input signal switches low after a period of quiescence. PMOS transistor 104 will switch on such that current source 108 begins charging capacitor 115. Prior to the voltage on terminal 114 passing above the inverter threshold voltage, the output signal is high such that OR gate 126 keeps PMOS transistor 119 off. But once the voltage on terminal 114 crosses the inverter threshold voltage, both the input and output signals are low such that OR gate 126 turns PMOS transistor 119 on, which quickly charges terminal 114 to VDD. In this fashion, PMOS transistor 119 accomplishes what PMOS transistor 104 would have done but for the presence of current source 108.

Operation of logic circuit 116 as the input signal switches high after a period of quiescence (or when in low-frequency operation) is analogous. As the input signal switches high, NMOS transistor 106 turns on such that current source 112 discharges capacitor 115. Prior to the voltage on terminal 114 passing below the inverter threshold voltage, the output signal is low such that AND gate 122 keeps an NMOS transistor 124 off. But once the voltage on terminal 114 crosses the inverter threshold voltage, both the input and output signals are high such that AND gate 122 switches on NMOS transistor 124, which quickly discharges terminal 114 to ground. In this fashion, capacitor 115 will be discharged to ground prior to the input signal going low in low-frequency operation. Similarly, capacitor 115 will be charged to VDD prior to the input signal going high in low-frequency operation. But if the input signal is switching states rapidly, as would occur in high-frequency operation, the output signal will not respond to these changes since the inverter threshold voltage will not be crossed in such cases. This is quite advantageous as frequency detector 100 thus performs a frequency detection without the die area demands that would otherwise occur if LC or RC filters were used to filter out the high-frequency regime. If the frequency detection indicates low-frequency operation, frequency detector 100 effectively passes the input signal as the output signal. Conversely, if the frequency detection indicates high-frequency operation, frequency detector 100 blocks the input signal from passing as the output signal. Moreover, this frequency detection is accomplished while consuming relatively little power as compared to prior art solutions.

The delay required to discharge terminal 114 from VDD through the inverter threshold voltage determines the cutoff frequency following a rising edge of the input signal. Similarly, the delay required to charge terminal 114 from ground through the inverter threshold voltage determines the cutoff frequency following a falling edge of the input signal. Ideally, these two delays are equal but they may differ in some embodiments. Note that inverter 120 may comprise a Schmitt trigger in alternative embodiments such that the inverter threshold voltage differs depending upon whether capacitor 115 is being charged or discharged. The inverter threshold voltage would thus comprise a discharging threshold voltage and a higher charging threshold voltage in such embodiments. The resulting hysteresis makes the inverter operation more resistant to noise on the input signal that might otherwise trigger undesired transitions in the output signal. But it will be appreciated that the operation of frequency detector 100 remains fundamentally the same regardless of whether hysteresis is implemented in inverter 120.

To make the cutoff frequency programmable, current sources 108 and 112 may comprise variable current sources such as transistors receiving a variable bias voltage. Similarly, capacitor 115 may comprise a variable capacitor such as a varactor to provide additional flexibility in setting the cutoff frequency. In this fashion, frequency detector 100 can accommodate various signaling standards that have different cutoff frequencies.

Frequency detector 100 may be used to demodulate the input signal in pulse-width-modulated embodiments in which the input signal is pulsed in relatively-narrow pulses and relatively-wide pulses. The relatively-narrow pulses of the input signal do not stay high long enough such that capacitor 115 discharges below the inverter threshold voltage. The output signal would thus not transition responsive to such a narrow pulse of the input signal. Conversely, a relatively-wide pulse of the input signal does stay high long enough such capacitor 115 will discharge below the inverter threshold voltage. Inverter 120 would thus drive the output signal to pulse high in response to such an input signal pulse. In this fashion, frequency detector 100 demodulates the pulse-width-modulated input signal by blocking the output signal from responding to narrower pulses of the input signal whereas the output signal is pulsed in response to wider pulses of the input signal.

Figure 2:
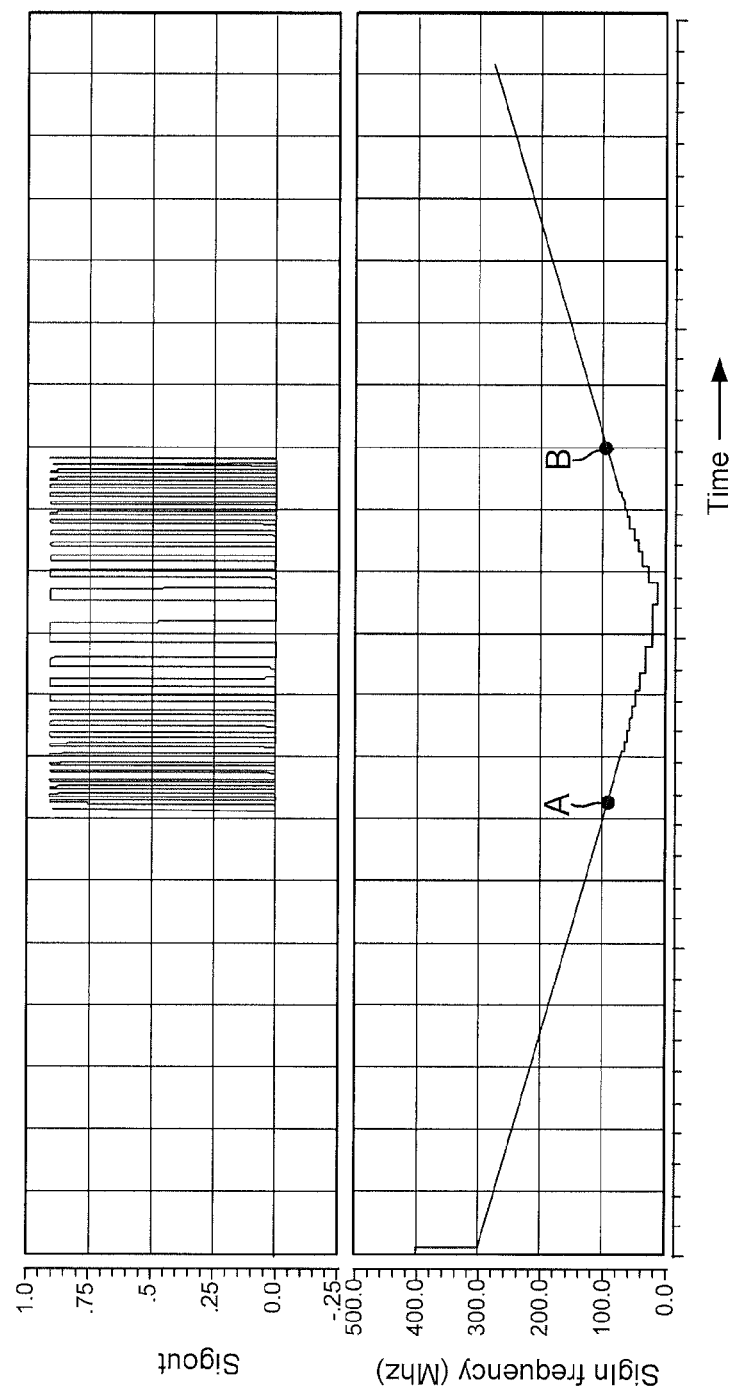
FIG. 2 illustrates simulation results for an example frequency detector output signal as a function of the input signal frequency.

Simulation results for the advantageous operation of frequency detector 100 are shown in FIG. 2, which shows the output signal (Sigout) as a function of the input frequency for the input signal (Sigin). In particular, the frequency for Sigin is linearly decreased from 300 MHz to approximately 25 MHz and then linearly increased back to 300 MHz. In this embodiment, the cutoff frequency was 92 MHz. Thus, Sigout is blocked as the frequency of Sigin is linearly decreased from 300 MHz to the cutoff frequency of 92 MHz. Sigout then begins to cycle responsive to cycles of Sigin as the frequency of Sigin is reduced from the cutoff frequency (point A) to 25

MHz and then increased again to the cutoff frequency. Sigout is again blocked as the frequency of Sigin increases over the cutoff frequency (point B).

Figure 3:
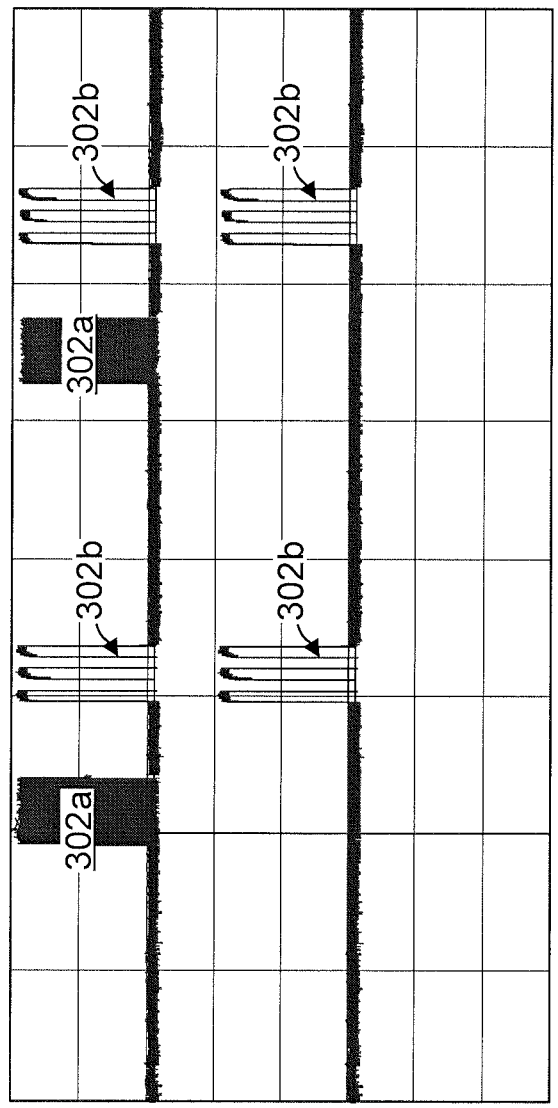
FIG. 3 illustrates simulation results for an example frequency detector output and input signals.

An analogous simulation result is shown in FIG. 3. Sigin is shown having bursts of high-speed data 302a and also bursts of low-frequency sideband signals 302b. But Sigout does not cycle in response to high-speed data bursts 302a. Instead, Sigout only cycles in sideband bursts 302b.

Figure 4:
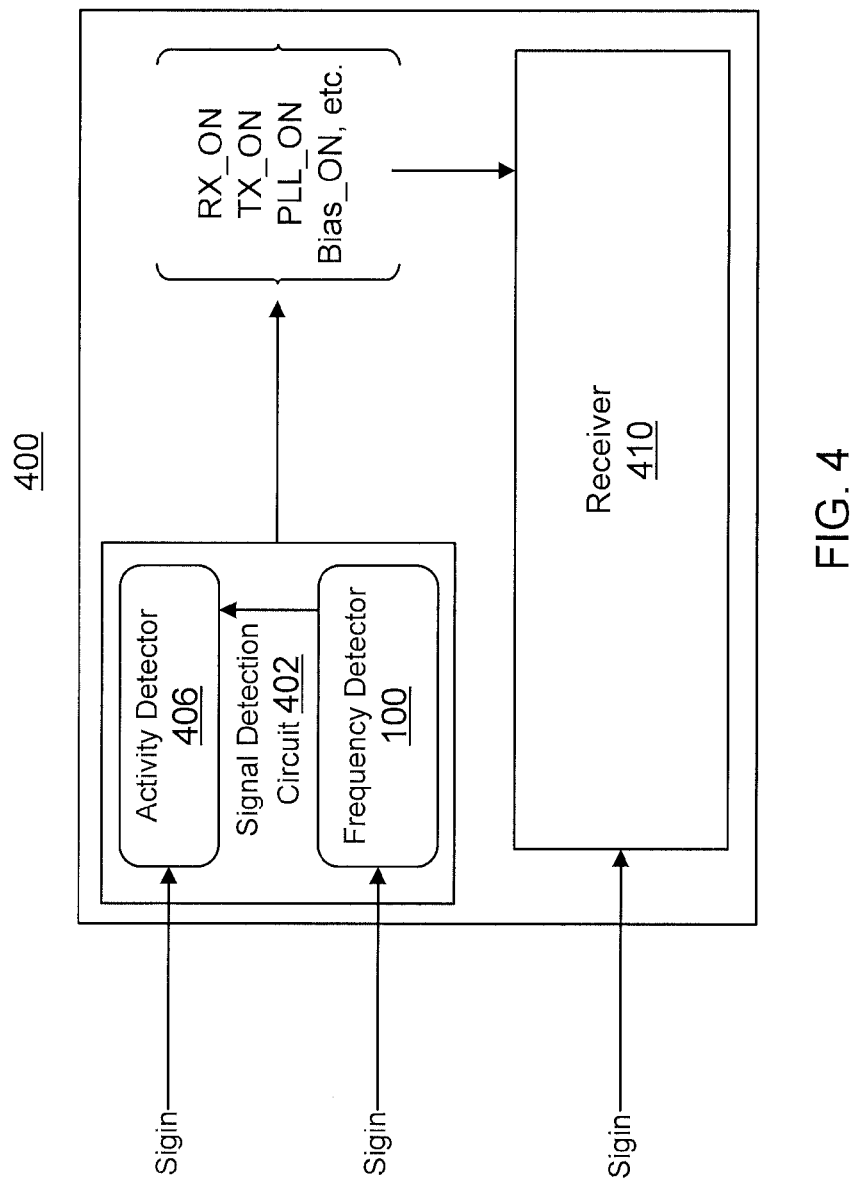
FIG. 4 is a block diagram for an example receiver system incorporating a frequency detector in accordance with an embodiment of the disclosure.

An example system 400 shown in FIG. 4 incorporates frequency detector 100 in a signal detector circuit 402. System 400 also includes a receiver 410, which may comprise a SerDes, a pulse width demodulator, or other suitable receiver that may advantageously operate in conjunction with frequency detector 100 such as a time-to-digital converter. Signal detector circuit 402 includes an activity detector logic circuit 406 that receives the input signal (Sigin) and also receives the output signal (Sigout) from frequency detector 100. Since activity detector logic circuit 406 receives Sigin, it may detect when there is activity on Sigin, regardless of whether that activity corresponds to signaling at a frequency below the cutoff frequency or above the cutoff frequency. But there is only activity on Sigout when Sigin is in the low-frequency regime. Thus, if activity detector logic circuit 406 detects activity on Sigin but not on Sigout, high-speed operation of Sigin is indicated by signal detection circuit 402. Conversely, if activity logic detector determines that there is activity on both Sigin and Sigout, then low-frequency operation of Sigin is indicated by signal detection circuit 402.

Receiver 410 receives Sigin in parallel with signal detection circuit 402. Thus, operation of frequency detector 100 has no effect on the signal quality of Sigin as received by receiver 410. Depending upon whether high-frequency or low-frequency operation is indicated by activity detector 406, a variety of functions may be activated. For example, signal detection circuit 402 may assert or de-assert various signals such as a receiver on signal (RX_ON), a transmitter on signal (TX_ON), a phase-locked-loop on signal (PLL_ON), or a bias signal (Bias_ON). The operation of receiver 410 may then be adjusted accordingly depending upon whether the activity on Sigin corresponds to low-frequency or high-speed operation. An example method of operation for a frequency detector as discussed herein will now be addressed.

Example Method of Operation

Figure 5:
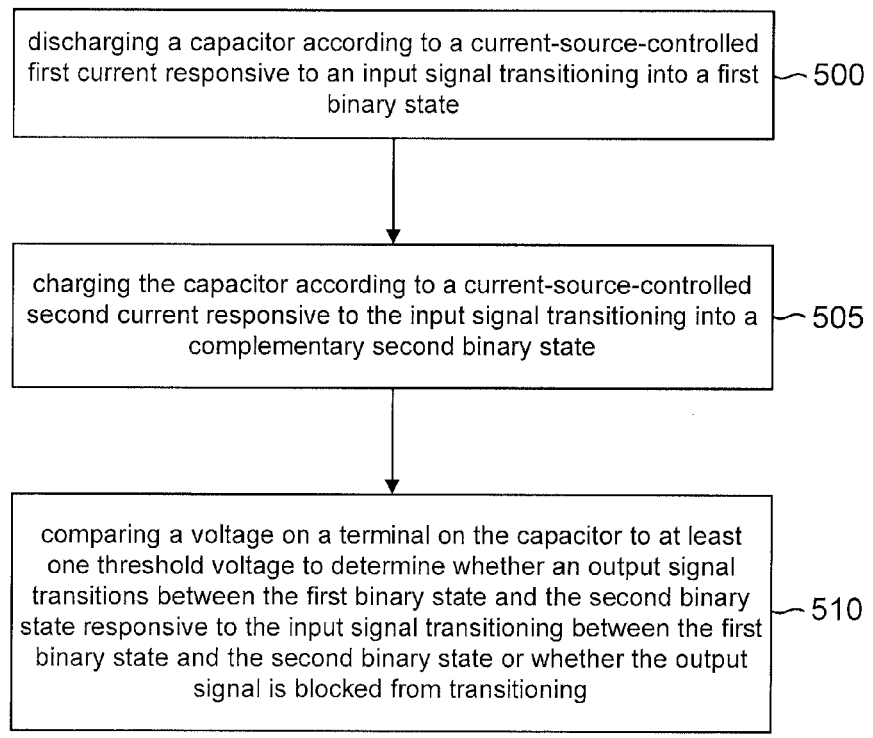
FIG. 5 is a flowchart for a method of operation for an example frequency detector in accordance with an embodiment of the disclosure.

Referring now to FIG. 5, a flow diagram is provided that illustrates a method for signal frequency detection according to an embodiment of the present disclosure. It should be noted that the method illustrated in the embodiment of FIG. 5 may be implemented by the circuit illustrated in the embodiment of FIG. 1. A step 500 comprises discharging a capacitor according to a current-source-controlled first current responsive to an input signal transitioning into a first binary state. Referring again to FIG. 1, the discharging of capacitor 115 responsive to the input signal transitioning high is an example of such a method act.

In FIG. 5, a step 505 comprises charging the capacitor according to a current-source-controlled second current responsive to the input signal transitioning into a complementary second binary state. Referring again to FIG. 1, the charging of capacitor 115 responsive to the input signal transitioning low is an example of such a method act.

Finally, a step 510 of FIG. 5 comprises comparing a voltage on a terminal on the capacitor to at least one threshold voltage to determine whether an output signal transitions between the first binary state and the second binary state responsive to the input signal transitioning between the first binary state and the second binary state or whether the output signal is blocked from transitioning. Referring again to FIG. 1, inverter 120 driving the output signal responsive to the inversion of the voltage on terminal 114 is an example of such a method act. If inverter 120 has no hysteresis, then the "at least one" inverter threshold voltage is singular. But if inverter 120 has hysteresis (such as through a Schmitt trigger embodiment), then the at least one inverter threshold voltage comprises a pair of threshold voltages as discussed above.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
a switch configured to couple a capacitor to a first current source to discharge the capacitor responsive to receipt of an input signal having a first binary state, the switch being further configured to couple the capacitor to a second current source to charge the capacitor responsive to receipt of the input signal having a complementary second binary state;
an inverter configured to drive an output signal into the first and second binary states responsive to a comparison of a voltage on a terminal for the capacitor to an at least one inverter threshold voltage; and
a logic circuit configured to couple the terminal to a power supply node responsive to the inverter driving the output signal into the second binary state and to couple the terminal to ground responsive to the inverter driving the output signal into the first binary state.

2. The circuit of claim 1, wherein the inverter comprises a Schmitt trigger, and wherein the at least one inverter threshold voltage comprises a first threshold voltage and a second threshold voltage.

3. The circuit of claim 1, wherein the switch comprises a PMOS transistor and an NMOS transistor having their gates configured to receive the input signal.

4. The circuit of claim 3, wherein a source of the PMOS transistor is coupled to the power supply node through the first current source and a source of the NMOS transistor is coupled to ground through the second current source, and wherein a drain for the PMOS transistor and a drain the NMOS transistor are both coupled to the terminal of the capacitor.

5. The circuit of claim 1, wherein the first current source and the second current source are both variable current sources.

6. The circuit of claim 1, wherein the capacitor is a variable capacitor.

7. The circuit of claim 1, wherein logic circuit comprises an OR gate and an AND gate.

8. The circuit of claim 7, wherein the logic circuit further comprises a PMOS transistor having a source coupled to the power supply node and a drain coupled to the terminal, and wherein the OR gate is configured to drive a gate of the PMOS transistor responsive to an OR of the input signal and the output signal.

9. The circuit of claim 7, wherein the logic circuit further comprises an NMOS transistor having a source coupled to ground and a drain coupled to the terminal, wherein the AND gate is configured to drive a gate of the NMOS transistor responsive to an AND of the input signal and the output signal.

10. A method comprising:
discharging a capacitor according to a current-source-controlled first current responsive to an input signal transitioning into a first binary state;
charging the capacitor according to a current-source-controlled second current responsive to the input signal transitioning into a complementary second binary state; and
comparing a voltage on a terminal on the capacitor to an at least one inverter threshold voltage to determine whether an output signal transitions between the first binary state and the second binary state responsive to the input signal transitioning between the first binary state and the second binary state or whether the output signal is blocked from transitioning.

11. The method of claim 10, wherein the input signal has a voltage in the first binary state that is higher than a voltage for the input signal in the second binary state, the method further comprising determining whether the input signal transitions between the first and second binary states according to a low-frequency rate or according to a high-frequency rate responsive to whether the output signal transitions responsive to the input signal.

12. The method of claim 11, wherein charging the capacitor is responsive to falling edges of the input signal, and wherein discharging the capacitor is responsive to rising edges of the input signal.

13. The method of claim 11, wherein determining whether the input signal transitions according to the low-frequency rate comprises determining that the output signal is driven to transition between the first binary state and the second binary state responsive to the input signal transitioning between the first and second binary states.

14. The method of claim 13, wherein the input signal is an input signal to a SerDes, and wherein the low-frequency rate corresponds to a low-frequency sideband rate.

15. The method of claim 14, the method further comprising detecting receipt of the input signal according to the high-frequency rate when the output signal is blocked from transitioning responsive to the transitions of the input signal.

16. The method of claim 10, wherein the input signal is a pulse-width-modulated signal, the input signal transitioning into the first binary state in pulses according to a first pulse width and according to a second pulse width narrower than the first pulse width, the method further comprising detecting receipt of pulses of the first pulse width when the output signal transitions responsive to the transitions of the input signal and detecting receipt of pulses of the second pulse width when the output signal is blocked from transitioning according to the transitions of the input signal.

17. A circuit comprising:
a switch configured to couple a capacitor to a first current source to charge the capacitor responsive to receipt of an input signal having a first binary state, the switch being further configured to couple the capacitor to a second current source to discharge the capacitor responsive to receipt of the input signal having a complementary second binary state;
an inverter configured to drive an output signal into the first and second binary states responsive to comparing a voltage on a terminal for the capacitor to an at least one inverter threshold voltage;
first means for discharging the terminal to ground responsive to the inverter driving the output signal into the second binary state; and
second means for charging the terminal to a power supply voltage VDD responsive to the inverter driving the output signal into the first binary state.

18. The circuit of claim 17, wherein the first means comprises an AND gate configured to AND the output signal and the input signal.

19. The circuit of claim 17, wherein the second means comprises an OR gate configured to OR the output signal and the input signal.

20. The circuit of claim 17, wherein the inverter comprises a Schmitt trigger, the at least one inverter threshold voltage comprising two threshold voltages.

21. A system comprising:
a receiver including a serializer/deserializer (SerDes) configured to receive an input signal that operates in both a high-speed mode and a low-frequency sideband mode; and
a frequency detector configured to receive the input signal in parallel with the SerDes receiver, the frequency detector including a capacitor configured to charge or discharge responsive to binary states of the input signal, wherein the capacitor is configured to charge according to a first current source current responsive to the input signal transitioning into a first binary state, and wherein the capacitor is configured to discharge according to a second current source current responsive to the input signal transitioning into a complementary second binary state, the frequency detector being further configured to detect whether the input signal is in the high-speed mode or in the low-frequency sideband mode responsive to the charging and discharging of the capacitor.

22. The system of claim 21, wherein the receiver includes a phase-locked loop (PLL), and wherein the frequency detector is configured to signal the PLL to operate responsive to whether the input signal is in the high-speed mode or in the low-frequency sideband mode.

23. The system of claim 21, wherein the frequency detector is configured to signal the receiver to operate responsive to whether the input signal is in the high-speed mode or in low-frequency sideband mode.

24. The system of claim 21, wherein the frequency detector further comprises a switch configured to couple a terminal of the capacitor to a first current source to receive a first current source current to charge the capacitor responsive to the input signal transitioning into the first binary state, and wherein the switch is further configured to couple the terminal to a second current source to discharge a second current source current responsive to the input signal transitioning into the second binary state.

25. The system of claim 24, wherein the switch comprises a PMOS transistor and an NMOS transistor.

26. The system of claim 24, wherein the frequency detector further comprises an inverter configured to drive an output signal responsive to a comparison of a voltage for the terminal to an inverter threshold voltage.

27. The system of claim 26, wherein the frequency detector is further configured to detect whether the input signal is in the low-frequency sideband mode through a determination that the output signal switches binary states responsive to the input signal switching binary states.

28. The system of claim 26, wherein the frequency detector is further configured to detect whether the input signal is in the high-speed mode through a determination of that the output signal does not switch binary states responsive to the input signal switching binary states.

29. The system of claim 24, wherein the first current source comprises a variable current source.

30. The system of claim 24, wherein the second current source comprises a variable current source.

* * * * *